US012321112B2

(12) United States Patent
Kubota

(10) Patent No.: US 12,321,112 B2
(45) Date of Patent: Jun. 3, 2025

(54) FIXING DEVICE AND IMAGE FORMING APPARATUS INCORPORATING THE SAME

(71) Applicant: Keisuke Kubota, Kanagawa (JP)

(72) Inventor: Keisuke Kubota, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/509,422

(22) Filed: Nov. 15, 2023

(65) Prior Publication Data

US 2024/0168417 A1 May 23, 2024

(30) Foreign Application Priority Data

Nov. 17, 2022 (JP) ................................ 2022-184136

(51) Int. Cl.
*G03G 15/20* (2006.01)

(52) U.S. Cl.
CPC ..... *G03G 15/2025* (2013.01); *G03G 15/2064* (2013.01); *G03G 2215/2025* (2013.01)

(58) Field of Classification Search
CPC ........... G03G 15/2017; G03G 15/2025; G03G 15/2064; G03G 2215/2025
See application file for complete search history.

(56) References Cited

U.S. PATENT DOCUMENTS

2015/0253708 A1 9/2015 Hirose et al.
2016/0026125 A1 1/2016 Ishii et al.
2016/0070218 A1 3/2016 Hirose et al.
2016/0139549 A1 5/2016 Nozawa et al.
2016/0170350 A1 6/2016 Hirose et al.
2017/0052492 A1 2/2017 Kawabe et al.
2018/0081309 A1 3/2018 Hirose et al.
2018/0299809 A1 10/2018 Saitoh et al.
2020/0089147 A1 3/2020 Hasegawa et al.
2021/0141322 A1 * 5/2021 Tatezawa ........... G03G 15/2053

FOREIGN PATENT DOCUMENTS

JP 2020-046502 A 3/2020
JP 2021-140135 A 9/2021

* cited by examiner

*Primary Examiner* — Hoang X Ngo

(74) *Attorney, Agent, or Firm* — XSENSUS LLP

(57) ABSTRACT

A fixing device includes a belt having a loop, a nip formation pad inside the loop, a pressure rotator, a supplier, and a holder. The pressure rotator presses the belt against the nip formation pad to form a fixing nip. The supplier is at a position above and upstream from the nip formation pad in the traveling direction to supply lubricant to an inner face of the belt. The holder holds the lubricant adhered to the inner face of the belt. The fixing nip forms a line passing through an entrance and an exit of the fixing nip. The belt forms a tangent at a contacting point with the supplier. The tangent extends to the nip formation pad adjacent to the entrance of the fixing nip in the traveling direction. The line and the tangent form an angle that is 25 degrees or more and 55 degrees or less.

8 Claims, 5 Drawing Sheets

FIXING DEVICE AND IMAGE FORMING APPARATUS INCORPORATING THE SAME

CROSS-REFERENCE TO RELATED APPLICATION

This patent application is based on and claims priority pursuant to 35 U.S.C. § 119(a) to Japanese Patent Application No. 2022-184136, filed on Nov. 17, 2022, in the Japan Patent Office, the entire disclosure of which is hereby incorporated by reference herein.

BACKGROUND

Technical Field

Embodiments of the present disclosure relate to a fixing device and an image forming apparatus incorporating the fixing device.

Related Art

An electrophotographic image forming apparatus includes a fixing device. The fixing device includes a heater, a fixing belt having an endless shape and heated by the heater, and a pressing member in contact with the fixing belt to form a fixing nip. A recording medium on which a toner image is transferred passes through the fixing nip, and heat and pressure in the fixing nip fix the toner image onto the recording medium.

One type of fixing device includes a nip formation pad inside the loop of the fixing belt and the pressing member made of an elastic material. The pressing member is pressed against the nip formation pad across the fixing belt and elastically deformed to form the fixing nip. Such a fixing device is referred to as a sliding fixing device. In the sliding fixing device, the fixing belt slides on the nip formation pad fixed in the fixing device. To reduce a frictional resistance caused by the fixing belt sliding on the nip formation pad, lubricant is applied to the inner surface of the fixing belt.

SUMMARY

This specification describes an improved fixing device that includes a belt, a nip formation pad, a pressure rotator, a supplier, and a holder. The belt has a loop rotatable in a traveling direction. The nip formation pad is inside the loop. The pressure rotator presses the belt against the nip formation pad to form a fixing nip between the belt and the pressure rotator to press a recording medium passing through the fixing nip. The supplier is at a position above and upstream from the nip formation pad in the traveling direction to supply lubricant to an inner face of the belt. The holder holds the lubricant adhered to the inner face of the belt. The fixing nip forms a line passing through an entrance of the fixing nip and an exit of the fixing nip. The belt forms a tangent at a contacting point with the supplier. The tangent extends to the nip formation pad adjacent to the entrance of the fixing nip in the traveling direction. The line and the tangent form an angle that is 25 degrees or more and 55 degrees or less.

This specification also describes an image forming apparatus including the fixing device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
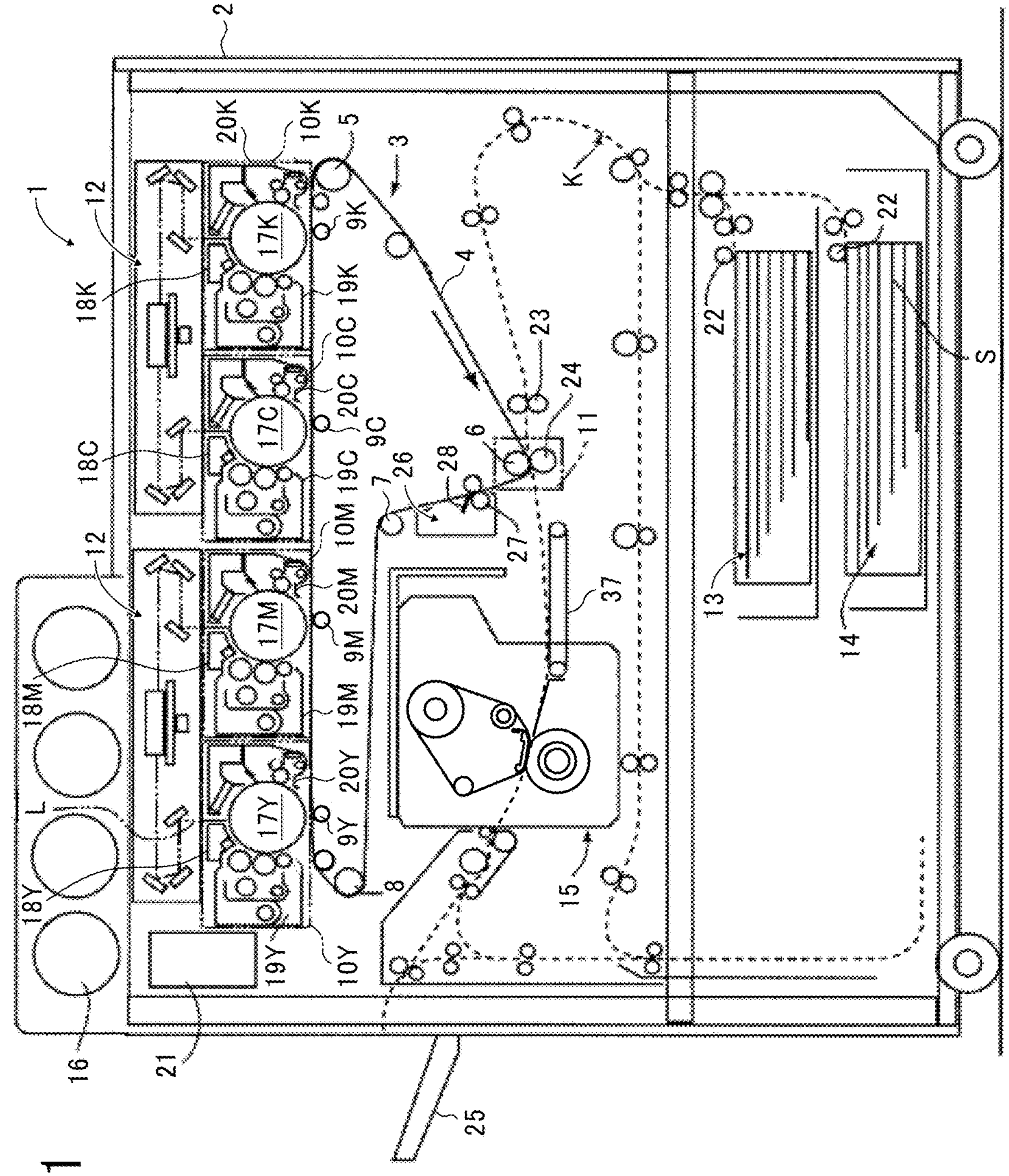
FIG. 1 is a schematic diagram illustrating a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below: As used herein, the singular forms "a," "an," and "the" are intended to include the plural forms as well, unless the context clearly indicates otherwise.

With reference to drawings, descriptions are given below of embodiments of the present disclosure. In the drawings illustrating embodiments of the present disclosure, elements or components having identical or similar functions or shapes are given similar reference numerals as far as distinguishable, and redundant descriptions are omitted.

FIG. 1 is a schematic diagram illustrating a configuration of an image forming apparatus 1 according to an embodiment of the present disclosure. The image forming apparatus 1 includes a fixing device 15 according to an embodiment of the present disclosure.

In FIG. 1, the image forming apparatus 1 is a printer and includes an intermediate transfer unit 3 substantially at the center of an apparatus main body 2. The intermediate transfer unit 3 includes an intermediate transfer belt 4 as an intermediate transferor, and the intermediate transfer belt 4 is stretched in a loop shape by a plurality of support rollers. The support rollers include a drive roller 5 that rotates the intermediate transfer belt 4 clockwise in FIG. 1, a secondary transfer backup roller 6, driven rollers 7 and 8, and four primary transfer rollers 9Y, 9M, 9C, and 9K.

The intermediate transfer belt 4 is stretched in a posture like a substantially inverse triangle. Above an upper surface of the stretched intermediate transfer belt 4 that is the upper side of the inverse triangle, four process cartridges 10Y, 10M, 10C, and 10K are arranged side by side in the horizontal direction. The process cartridges 10Y, 10M, 10C, and 10K correspond to yellow; magenta, cyan, and black, respectively.

The process cartridge 10Y includes parts to form a yellow toner image, and the formed yellow toner image is transferred onto the intermediate transfer belt 4. Similarly, the process cartridge 10M includes parts to form a magenta toner image, the process cartridge 10C includes parts to form a cyan toner image, and the process cartridge 10K includes parts to form a black toner image.

The magenta, cyan, and black toner images are transferred from the process cartridges 10M, 10C, and 10K to the intermediate transfer belt 4 at primary transfer positions at which the process cartridges 10M, 10C, and 10K face the primary transfer rollers 9M, 9C, and 9K, respectively. The intermediate transfer belt 4 rotates, and the color toner images primarily transferred onto the intermediate transfer belt 4 reach a secondary transfer portion 11.

In FIG. 1, above the process cartridges 10Y, 10M, 10C, and 10K, a pair of exposure units 12 are disposed, one of the pair of the exposure units irradiates photoconductor drums 17Y and 17M with exposure lights L based on yellow image data and magenta image data, and the other one irradiates photoconductor drums 17C and 17K with exposure lights L based on cyan image data and black image data. The pair of exposure units 12 includes a laser controller that receives image data of each color based on image data of a document transmitted from a scanner to a controller 21 and semiconductor lasers that emit four exposure light beams L. The exposure light beams L scan photoconductor drums 17Y, 17M, 17C, and 17K in the process cartridges 10Y, 10M, 10C, and 10K and write electrostatic latent images of yellow; magenta, cyan, and black on the surfaces of the photoconductor drums 17Y, 17M, 17C, and 17K, respectively.

As illustrated in FIG. 1, the image forming apparatus 1 includes sheet trays 13 and 14 accommodating sheets S as recording media, a fixing device 15 in which heat and pressure fix an unfixed toner image transferred onto the sheet S, and toner bottles 16 each accommodating toner therein. The detailed description of the configuration and operations of the fixing device 15 is deferred.

The following describes the process cartridges 10Y, 10M, 10C, and 10K. Since the process cartridges 10Y, 10M, 10C, and 10K have the same configuration except for the color of toner to be used, the process cartridge 10Y is described as a representative.

The process cartridge 10Y includes the photoconductor drum 17Y as an image bearer disposed substantially at the center of the process cartridge 10Y and, around the photoconductor drum 17Y, includes a charging device 18Y to charge the photoconductor drum 17Y and a developing device 19Y to develop the electrostatic latent image formed on the surface of the photoconductor drum 17Y.

In addition, the process cartridge 10Y includes, around the photoconductor drum 17Y, a photoconductor cleaner 20Y to collect untransferred toner remaining on the surface of the photoconductor drum 17Y and a discharger to remove electric charge on the photoconductor drum 17Y. The process cartridge 10Y includes a casing as a common support member supporting the above-described parts and is configured to be integrally attachable to and detachable from the apparatus main body 2 as a single unit to enhance maintainability.

Image forming operations of the image forming apparatus 1 are described below. First, the scanner transmits image data to the controller 21 including a microcomputer and being disposed inside the apparatus main body 2, and the controller 21 decomposes the received image data into four color image data of yellow, magenta, cyan, and black. For example, the controller 21 converts yellow image data into electrical signals and transmits the electrical signals to the exposure unit 12. The exposure unit 12 irradiates the photoconductor drum 17Y with the exposure light L such as laser light based on the yellow image data, i.e., the electrical signals transmitted from the controller 21.

The photoconductor drums 17Y, 17M, 17C, and 17K rotate counterclockwise in FIG. 1. Charging devices 18Y, 18M, 18C, and 18K uniformly charge surfaces of the photoconductor drums 17Y, 17M, 17C, and 17K. Irradiating the charged surface of the photoconductor drum 17Y with the exposure light L forms an electrostatic latent image corresponding to the yellow image data. Similarly, electrostatic latent images are formed on the surfaces of the photoconductor drums 17M, 17C, and 17K. The rotation of the photoconductor drum 17Y conveys the formed electrostatic latent image to a portion in which the photoconductor drum 17Y faces the developing device 19Y, and the developing device 19Y visualizes the electrostatic latent image. Similarly, developing devices 19M, 19C, and 19K visualize the electrostatic latent images.

The yellow; magenta, cyan, and black toners are stored in the toner bottles 16 and are supplied to the developing devices 19Y, 19M, 19C, and 19K, respectively. A stirrer in the developing device stirs and mixes the toner and carrier. Stirring the toner with the carrier triboelectrically charges the toner. Developer including the charged toner and the carrier is supplied to the developing roller. The developing roller rotates, and the developer borne on the developing roller passes through the gap between a doctor blade and the developing roller to have a uniform layer thickness. Subsequently, the developer on the developing roller comes into contact with the photoconductor drum, and the toner adheres to the electrostatic latent image on the photoconductor drum. As a result, the toner images are formed on the photoconductor drums 17Y, 17M, 17C, and 17K. The controller 21 controls the exposure units 12 and the devices in the process cartridges 10Y, 10M, 10C, and 10K to periodically form toner patterns on the photoconductor drums 17Y, 17M, 17C, and 17K. Reflection density sensors that are optical sensors detect image densities of the toner patterns on the photoconductor drums 17Y, 17M, 17C, and 17K. Based on the densities detected by the reflection density sensors, the controller 21 controls toner supply to the developing devices 19Y, 19M, 19C, and 19K.

The toner images developed by the developing devices 19Y, 19M, 19C, and 19K and formed on the surfaces of the photoconductor drums 17Y, 17M, 17C, and 17K are primarily transferred onto the intermediate transfer belt 4 at portions at which the photoconductor drums 17Y, 17M, 17C, and 17K face the primary transfer rollers 9Y, 9M, 9C, and 9K. After the primary transfer step, a small amount of untransferred toner that has not been transferred to the intermediate transfer belt 4 remains on the surface of each of the photoconductor drums 17Y, 17M, 17C, and 17K. Photoconductor cleaners 20Y, 20M, 20C, and 20K each include a brush, a roller, or a blade and each remove the untransferred toner on each of the photoconductor drums 17Y, 17M, 17C, and 17K. Subsequently, a discharger in each of the process cartridges removes electric charge on the photoconductor drum and enables starting a next image forming process.

Primarily transferring yellow, magenta, cyan, and black toner images from the process cartridges 10Y, 10M, 10C, and 10K to the intermediate transfer belt 4 and superimposing the toner images on the intermediate transfer belt 4 form a full-color toner image on the intermediate transfer belt 4.

The intermediate transfer belt 4 rotates, and the full-color toner image reaches the secondary transfer portion 11. At the same time, one of the sheet trays 13 and 14 is automatically or manually selected. For example, if the sheet tray 13 is selected, a feed roller 22 disposed on the sheet tray 13 rotates to feed one of the sheets S stored in the sheet tray 13 to a conveyance passage K, and the sheet S passes through the conveyance passage K and reaches a registration roller pair 23.

The registration roller pair 23 rotates to convey the sheet S to the secondary transfer portion 11, timed to coincide with the arrival of the full-color toner image on the intermediate transfer belt 4.

A secondary transfer roller 24 in the secondary transfer portion 11 is pressed against a secondary transfer backup roller 6 and contacts the intermediate transfer belt 4 to form a secondary transfer nip, the full-color toner image is transferred from the intermediate transfer belt 4 onto the sheet S in the secondary transfer nip. A conveyor 37 conveys the sheet S to which the full-color toner image is transferred to a fixing device 15, and heat and pressure fix the full-color toner image onto the sheet in the fixing device 15. After the full-color toner image is fixed onto the sheet S, the full-color toner image on the sheet S as an output image is ejected onto an output tray 25.

After passing through the secondary transfer portion 11, the intermediate transfer belt 4 reaches a belt cleaner 26 disposed downstream from the secondary transfer portion 11 in a rotation direction of the intermediate transfer belt 4. The belt cleaner 26 includes a cleaning brush 27 and a cleaning blade 28 and removes residual toner on the intermediate transfer belt 4. Thus, a series of the image forming processes is completed.

Figure 2:
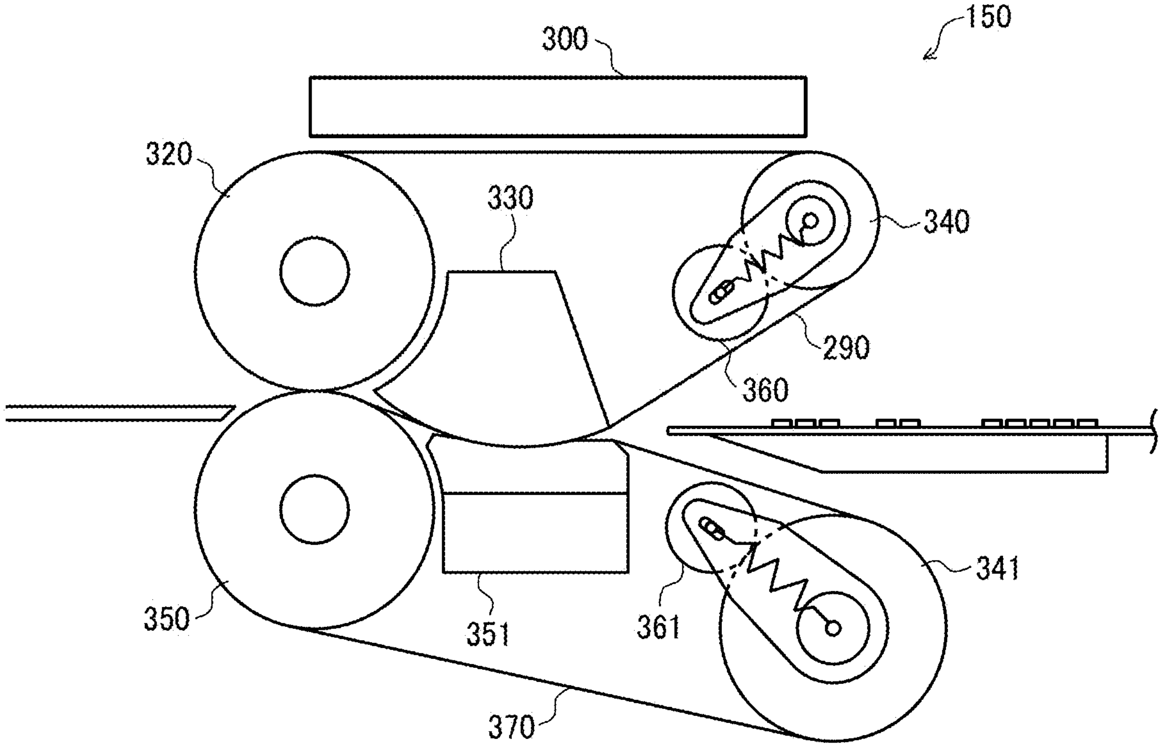
FIG. 2 is a schematic diagram illustrating a configuration of a fixing device according to a comparative example.

The following describes a fixing device 150 according to a comparative example with reference to FIG. 2.

As illustrated in FIG. 2, the fixing device 150 includes a heating belt 290 having an endless shape, an induction heating coil 300 as a heater to heat the surface of the heating belt, a drive roller 320 and a steering roller 340 as supports, a pad stay 330 as a nip formation pad, an oil application roller 360 as a supplier, a pressure roller 350 as a pressure rotator. In addition, the fixing device 150 includes a belt 370 wound around the pressure roller 350 and another steering roller 341, a pressure pad 351 that is pressed against the pad stay 330 across the heating belt 290 and the belt 370 to form a fixing nip, and another oil application roller 361 that applies lubricant to an inner face of the belt 370).

In the above-described structure, the oil application roller 360 supplies the lubricant to the inner face of the heating belt 290 to reduce frictional resistance of the heating belt 290 with respect to the pad stay 330. However, uniformly supplying an appropriate amount of the lubricant to the inner face of the fixing belt is not easy because the fixing belt waves while rotating.

Since the pad stay 330 is pressed against the pressure pad 351 across the heating belt 290 and the belt 370 to form the fixing nip, the lubricant supplied to the inner face of the heating belt 290 is blocked by the upstream side of the fixing nip in a belt traveling direction. The blocked lubricant moves along a side of the pad stay 330 adjacent to a fixing nip entrance toward both ends of the heating belt 290 in a width direction of the heating belt 290 and 20) gradually leaks from both ends of the heating belt 290 to the outside of the heating belt 290. The lubricant that leaks from the heating belt 290 adheres to parts inside the image forming apparatus and the output image, thereby causing contamination in the image forming apparatus and an image defect.

The depletion of the lubricant caused by the above-described leakage of the lubricant increases the frictional resistance between the pad stay 330 and the heating belt 290 and accelerates the wear of the heating belt 290. As a result, the above-described structure according to the comparative example cannot sufficiently obtain the durability of the heating belt and may cause a device failure.

Figure 3:
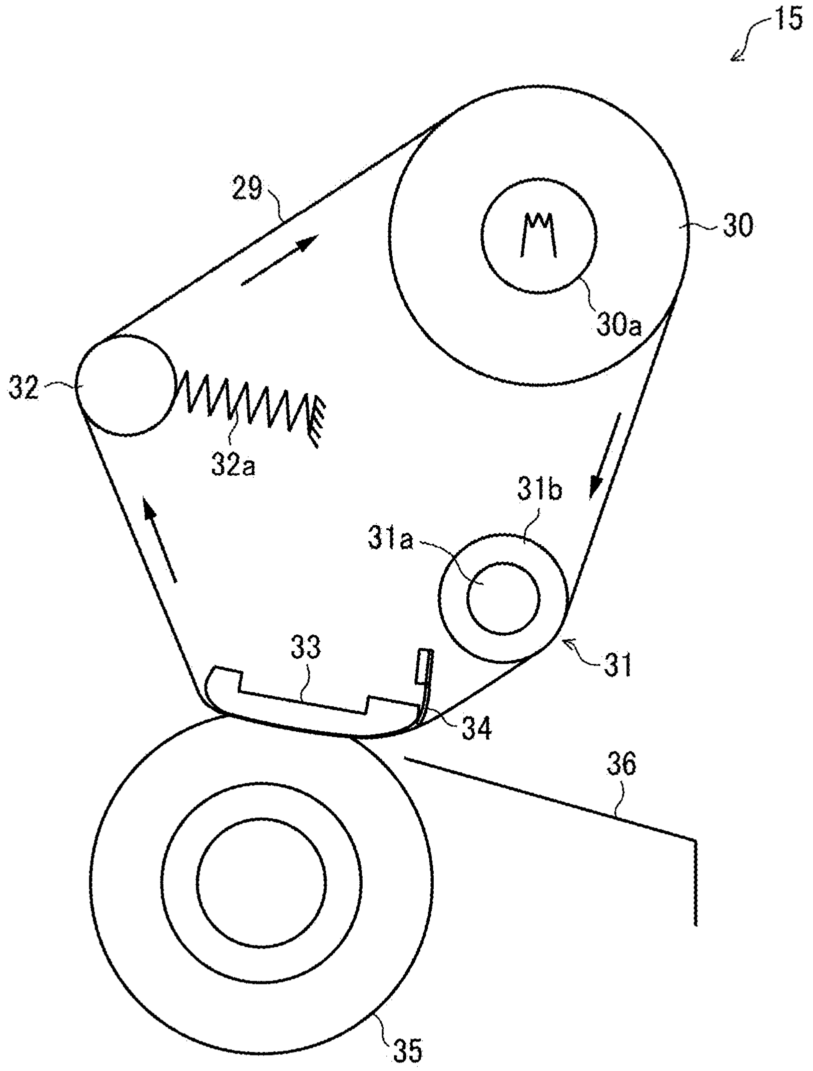
FIG. 3 is a schematic diagram illustrating a configuration of a fixing device installed in the image forming apparatus of FIG. 1.
Figure 4:
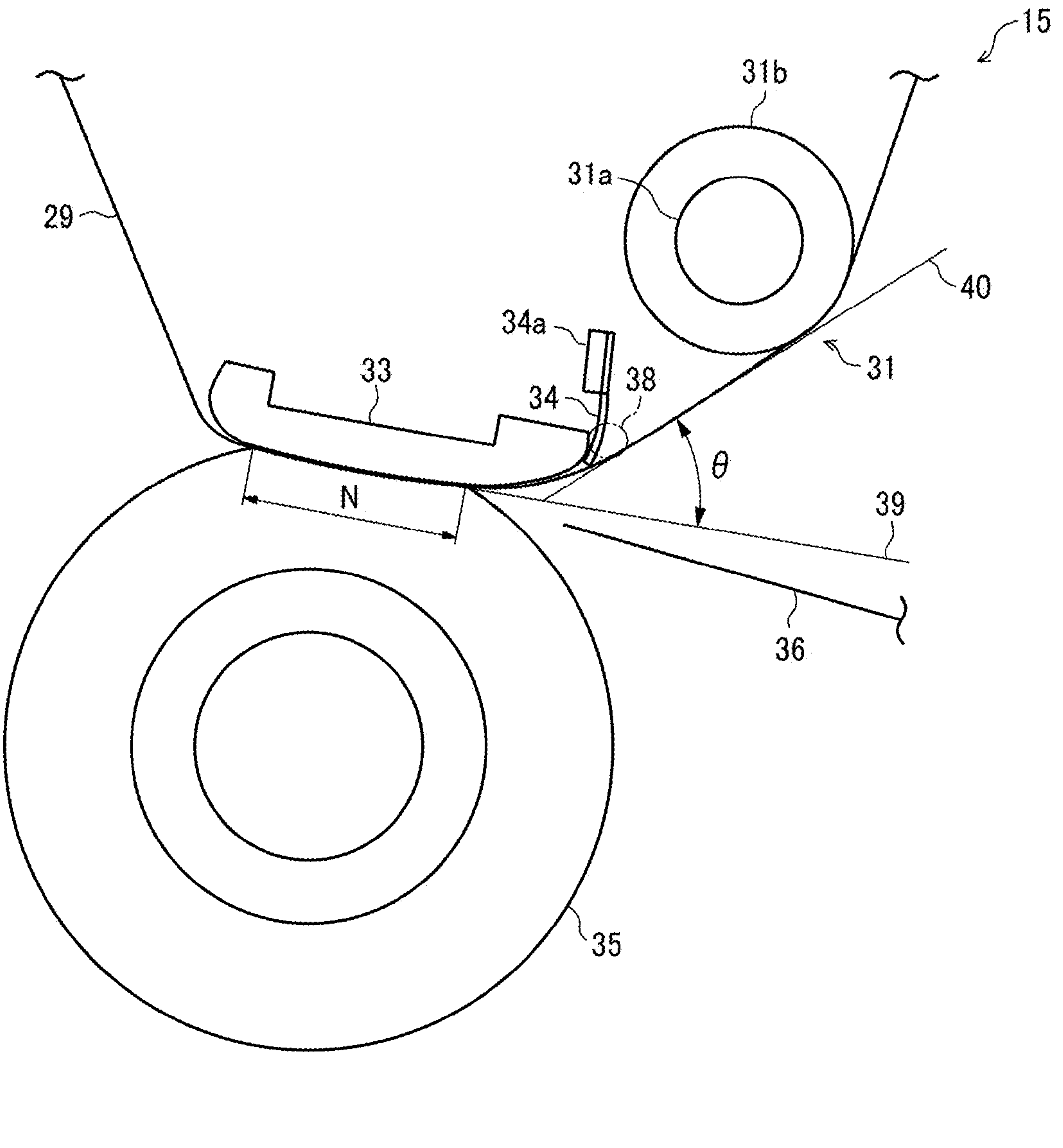
FIG. 4 is a partially enlarged view of FIG. 3 to illustrate the fixing device of FIG. 3.

The following describes the configuration and operations of the fixing device 15 according to an embodiment of the present disclosure that solves the above-described disadvantages. FIG. 3 is a schematic view of the fixing device 15, and FIG. 4 is a partially enlarged view of FIG. 3.

In FIG. 3, the fixing device 15 includes a fixing belt 29 as a belt that is an endless belt, a heating roller 30 as a heating rotator, a supply roller 31 as the supplier, and a tension roller 32 as the support. The fixing device 15 further includes a sliding pad 33 as the nip formation pad, a holder 34, a pressure roller 35 as the pressure rotator, and a guide 36. Each of the widths of the fixing belt 29, the sliding pad 33, the holder 34, and the pressure roller 35 in a width direction of the sheet S orthogonal to the sheet conveyance direction is set to be larger than the largest width of the widths of the sheets S on which the image forming apparatus 1 can form the image.

The fixing belt 29 is an endless belt having a multilayer structure, such as a two-layered belt including a base layer and a release layer or a three-layered belt including the base layer, an elastic layer, and the release layer. The surface of the fixing belt 29 including the elastic layer easily adheres to the toner image and enhances the image quality. The base layer of the fixing belt 29 is typically made of polyimide, and the release layer is made of perfluoroalkoxy alkane (PFA) or polytetrafluoroethylene (PTFE).

The heating roller 30 includes a heater 30*a* inside the heating roller 30, the heater 30*a* heats the heating roller 30, and the heating roller 30 heats the fixing belt 29. The fixing device 15 includes a temperature sensor to detect temperature of the surface of the fixing belt 29 in contact with the heating roller 30. Based on results detected by the temperature sensor, the controller 21 controls power supplied to the heater 30*a*. The heating roller 30 is rotatably supported by a frame 41 (see FIG. 5) of the fixing device 15 and is driven to rotate by rotation of the fixing belt 29.

The supply roller 31 around which the fixing belt 29 is wound includes a base 31*a* made of metal and a supplying portion 31*b* disposed around the base 31*a*. The frame 41 rotatably supports the base 31*a* of the supply roller 31. The supply roller 31 is driven to rotate by rotations of the fixing belt 29 traveling in the direction indicated by arrows in FIG. 3.

The supplying portion 31*b* is made of a nonwoven fabric such as felt, aramid, or polyethylene terephthalate (PET), or a fiber body having heat resistance and oil retention such as perfluoro alkoxyl alkane (PFA) or polytetrafluoroethylene (PTFE), and is impregnated with a low-viscosity lubricant having heat resistance, such as aminosilicone oil.

The tension roller 32 around which the fixing belt 29 is stretched is rotatably supported by a support plate that is movably supported by the frame 41. A compression spring 32*a* that urges the tension roller 32 leftward in FIG. 2 is attached to the support plate, and the tension roller 32 applies a predetermined tensile force to the fixing belt 29.

The sliding pad 33 is fixed on a stay; and the stay is fixed on the frame 41 of the fixing device 15. As a result, the position of the sliding pad 33 does not change even when the pressure roller 35 presses the sliding pad 33, which enables forming a uniform width of the fixing nip. Controlling force pressing the pressure roller 35 enables controlling the width of the fixing nip.

The sliding pad 33 has a nip formation surface along the sheet conveyance direction of the sheet S. To reduce the sliding friction between the sliding pad 33 and the fixing belt 29, a fluororesin layer is disposed on the nip formation surface. The sliding pad 33 has curves at both ends of the nip formation surface. The nip formation surface in the present embodiment has a curved surface but may have a flat surface. The curved surface of the sliding pad 33 is designed so as not to interfere with the conveyance of the sheet S.

The sliding pad 33 is preferably made of a heat-resistant material. This prevents thermal deformation of the sliding pad 33 at temperatures in a fixing temperature range desirable to fix the toner image on the sheet S, retains the fixing nip stably, and stabilizes output image quality.

Examples of the heat-resistant material of the sliding pad 33 include typical heat-resistant resin such as polyether sulfone (PES), polyphenylene sulfide (PPS), liquid crystal polymer (LCP), polyether nitrile (PEN), polyamide imide (PAI), and polyether ether ketone (PEEK).

The holder 34 is disposed in the vicinity of the sliding pad 33 and upstream from the sliding pad in the belt traveling direction.

The holder 34 is described later.

The pressure roller 35 is disposed outside the fixing belt 29 and faces the fixing belt 29 on the sliding pad 33. A contact-and-separation mechanism moves the pressure roller 35 to press against or separate from the fixing belt 29 on the sliding pad 33. The pressure roller 35 functions as an elastic body and includes an elastic layer made of, for example, silicon rubber, and the elastic layer forms an outer peripheral surface of the pressure roller 35. The pressure roller 35 presses the sliding pad 33 via the fixing belt 29 and elastically deforms to form the fixing nip N illustrated in FIG. 4. The fixing device 15 includes side plates pivotably disposed and a driver such as a motor attached to the side plate. The side plates rotatably support the pressure roller 35. The driver drives and rotates the pressure roller 35. When the contact-and-separation mechanism presses the pressure roller 35 against the sliding pad 33 across the fixing belt 29, the rotation of the pressure roller 35 rotates the fixing belt 29 in the direction indicated by the arrows in FIG. 3. In other words, the loop of the fixing rotates in a traveling direction of the fixing belt 29

The guide 36 includes a plate fixed on the side plates of the fixing device 15 and guides the sheet S conveyed by the conveyor 37 toward the fixing nip N.

Driving and rotating the pressure roller 35 that is pressed against the sliding pad 33 across the fixing belt 29 rotates the fixing belt 29. The rotation of the fixing belt 29 rotates the heating roller 30. The supplying portion 31*b* supplies the lubricant to the inner face of the fixing belt 29. The conveyor 37 conveys the sheet S to the fixing device 15, and the guide 36 guides the sheet S to the fixing nip N. The rotation of the pressure roller 35 conveys the sheet S in the fixing nip N. Heat is transmitted from the heater 30*a* to the sheet S via the heating roller 30 and the fixing belt 29 to melt the toner transferred on the sheet S, and pressure applied by the pressure roller 35 in addition to the heat fixes the toner image onto the sheet S.

The following describes arrangement regarding the supply roller 31 with respect to the fixing nip N, which is a feature of the present disclosure.

In the fixing device 15, the supply roller 31 supplies the lubricant to the inner face of the fixing belt 29. Since the lubricant supplied to the inner face of the fixing belt 29 gathers downward due to its own weight, the sliding pad 33 forming the fixing nip N that requires the lubricant most is disposed at the lowest position in the vertical direction of FIGS. 3 and 4. In order to efficiently supply the lubricant to the fixing nip N, the supply roller 31 is disposed at a position upstream from and closest to the sliding pad 33 in the traveling direction of the fixing belt 29.

In addition, in order to efficiently supply the lubricant to the sliding pad 33, the fixing device has a space 38 adjacent to an entrance of the fixing nip N, in other words, at a portion in the vicinity of an upstream end of the sliding pad 33 in the belt traveling direction to store the lubricant. To form the space 38, the supply roller 31 is arranged as illustrated in FIG. 4 so that an angle θ formed by a line 39 and a tangent 40 is 25 degrees or more and 55 degrees or less. The line 39 is formed by the fixing nip N and passes through the entrance of the fixing nip N and the exit of the fixing nip (N). The tangent 40 is formed by the belt at a contacting point with the supply roller as the supplier and extends to the nip formation pad 33 adjacent to the entrance of the fixing nip N in the traveling direction.

Too small angle θ in the above-described structure can give a sufficiently large space 38 but causes the following disadvantage. If the angle θ is too small, a distance between the guide 36 and the face of the fixing belt 29 becomes narrow: The narrow distance between the guide 36 and the face of the fixing belt 29 causes an edge of curled sheet S entering the fixing nip N to be folded. On the other hand, too large angle θ prevents the edge of curled sheet S from being folded but cannot obtain a sufficiently large space 38. As a result, too large angle θ causes a disadvantage that the lubricant is likely to leak to the outside in a width direction of the fixing belt 29. The present inventor conducted experiments to investigate whether the edge of the sheet is folded and whether the lubricant leaks to the outside of the fixing belt in each of the fixing devices having different angles θ. As a result, the present inventor found that the most preferable range of the angle θ was 25 degrees or more and 55 degrees or less.

The fixing device having the angle θ within the above range can preferably convey the sheet S and prevents leakage of the lubricant from both ends of the fixing belt 29 in the width direction of the fixing belt 29.

In the fixing device 15, setting the angle θ to the preferable value prevents the leakage of the lubricant. However, the pressure roller 35 applies a load of about 3 kgf to the sliding pad 33 in the fixing nip N formed during the fixing operations to fix the unfixed toner image onto the sheet S. As a result, the lubricant supplied to the inner face of the fixing belt 29 and stored in the space 38 may overflow after the fixing device 15 is used for a long time. In order to solve the above-described disadvantage that the lubricant overflows from the space 38 toward both ends of the fixing belt 29, the fixing device 15 according to an embodiment of the present disclosure includes the holder 34 to hold the lubricant.

Figure 5:
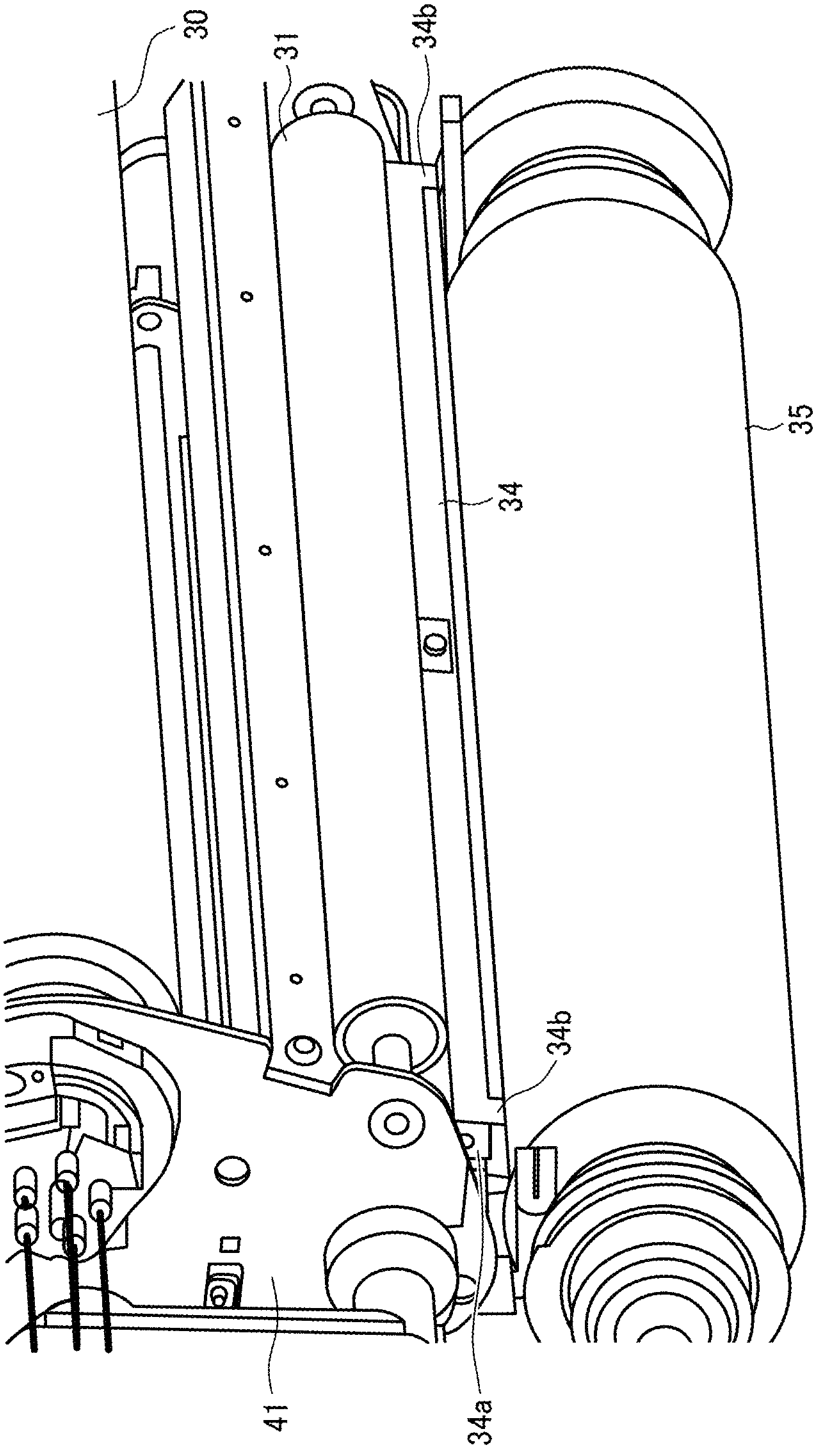
FIG. 5 is a schematic perspective view of a holder and parts around the holder in the fixing device of FIGS. 3 and 4.

As illustrated in FIGS. 4 and 5, the holder 34 includes an attachment 34*a* made of a metal plate and disposed at one end of the holder 34 in the belt traveling direction. The attachment 34*a* is fixed to the frame 41. The other end of the holder 34 is disposed between the fixing belt 29 and the sliding pad 33. Similar to the supplying portion 31*b*, the holder 34 is made of the nonwoven fabric such as felt, aramid, or polyethylene terephthalate (PET), or the fiber body having heat resistance, oil retention, and a thickness of about 2 mm, such as perfluoro alkoxyl alkane (PFA) or polytetrafluoroethylene (PTFE).

As illustrated in FIG. 5, the holder 34 includes end portions 34*b* and 34*b* disposed at both ends of the holder 34 in a width direction of the holder 34 that is a longitudinal direction of the holder 34 in FIG. 5, the width direction of the fixing belt 29, and an axial direction of the pressure roller 35. An area of the end portion 34*b* is larger than an area of another portion of the holder 34. In other words, a contact area where the end portion 34*b* contacts the fixing belt 29 is larger than a contact area where another portion of the holder 34 having the same length in the width direction as a length of the end portion 34*b* in the width direction contacts the fixing belt 29. A length of the end portion 34*b* in the belt traveling direction is longer than a length of another portion of the holder 34 in the belt traveling direction.

In the above-described structure, the holder 34 holds the lubricant accumulated in the space 38 in which the lubricant is most concentrated on the inner face of the fixing belt 29, and each of the both end portions in the width direction each having a larger area than another portion of the holder 34 can hold a large amount of lubricant at the both end portions in the width direction. As a result, the above-described structure can efficiently prevent the lubricant from being blocked by the sliding pad 33 before the entrance of the fixing nip N and leaking from the both ends of the fixing belt 29.

The above-described structure can store an appropriate amount of lubricant on the inner face of the fixing belt 29 regardless of operations of the fixing device and store the lubricant in the space 38 in which the lubricant is mostly required. As a result, the above-described structure can provide the fixing device 15 and the image forming apparatus 1 using the fixing device 15 that can maintain a necessary lubricant for a long time and prevent the occurrence of device failure due to insufficient lubricant.

In the above-described embodiment and modification, the image forming apparatus 1 is the printer forming the full-color toner image as an example of the image forming apparatus according to the present embodiment, but the image forming apparatus is not limited to this. The present disclosure is also adoptable to a copier, a facsimile machine, and a multifunction peripheral (MFP).

In the above-described embodiment, the sheet S is mentioned as an example of the recording medium on which an image is formed and is not limited the standard paper but also includes thick paper, a postcard, a rolled sheet, an envelope, plain paper, thin paper, coated paper, art paper, tracing paper, an overhead projector transparency (OHP sheet or OHP film), a resin film, and any other sheet-shaped material on which an image can be formed.

Aspects of the present disclosure are, for example, as follows.

First Aspect

In a first aspect, a fixing device includes a belt, a nip formation pad, a pressure rotator, a supplier, and a holder. The belt has a loop rotatable in a traveling direction. The nip formation pad is inside the loop. The pressure rotator presses the belt against the nip formation pad to form a fixing nip between the belt and the pressure rotator to press a recording medium passing through the fixing nip. The supplier is at a position above and upstream from the nip formation pad in the traveling direction to supply lubricant to an inner face of the belt. The holder holds the lubricant adhered to the inner face of the belt. The fixing nip forms a line passing through an entrance of the fixing nip and an exit of the fixing nip. The belt forms a tangent at a contacting point with the supplier. The tangent extends to the nip formation pad adjacent to the entrance of the fixing nip in the traveling direction. The line and the tangent form an angle that is 25 degrees or more and 55 degrees or less.

Second Aspect

In a second aspect, the holder in the fixing device according to the first aspect has end portions at both ends of the holder in a width direction of the holder, and each of the end portions contacting the belt has a first length in the traveling direction, and another portion between the end portions of the holder in the width direction has a second length shorter than the first length in the traveling direction.

Third Aspect

In a third aspect, the holder in the fixing device according to the first aspect or the second aspect is made of non-woven fabric.

Fourth Aspect

In a fourth aspect, the holder in the fixing device according to the first aspect or the second aspect is made of a fiber body.

Fifth Aspect

In a fifth aspect, an image forming apparatus includes the fixing device according to any one of the first to fourth aspects.

The above-described embodiments are illustrative and do not limit the present disclosure. Thus, numerous additional modifications and variations are possible in light of the above teachings. For example, elements and/or features of the embodiment and variation may be combined with each other and/or substituted for each other within the scope of the present disclosure.

The advantages achieved by the embodiments described above are examples and therefore are not limited to those described above.

The invention claimed is:

1. A fixing device comprising:

a belt having a loop rotatable in a traveling direction;

a nip formation pad inside the loop;

a pressure rotator to press the belt against the nip formation pad to form a fixing nip between the belt and the pressure rotator to press a recording medium passing through the fixing nip;

a supplier at a position above and upstream from the nip formation pad in the traveling direction to supply lubricant to an inner face of the belt; and a holder to hold the lubricant adhered to the inner face of the belt, wherein the fixing nip forms a line passing through an entrance of the fixing nip and an exit of the fixing nip, the belt forms a tangent at a contacting point with the supplier, the tangent extends to the nip formation pad adjacent to the entrance of the fixing nip in the traveling direction, and the line and the tangent form an angle that is 25 degrees or more and 55 degrees or less, wherein:

the holder has end portions at both ends of the holder in a width direction of the holder, each of the end portions contacting the belt has a first length in the traveling direction, and another portion between the end portions of the holder in the width direction has a second length shorter than the first length in the traveling direction.

2. The fixing device according to claim 1, wherein the holder is made of non-woven fabric.

3. The fixing device according to claim 1, wherein the holder is made of a fiber body.

4. An image forming apparatus comprising the fixing device according to claim 1.

5. A fixing device comprising:

a belt having a loop rotatable in a traveling direction;

a nip formation pad inside the loop;

a pressure rotator to press the belt against the nip formation pad to form a fixing nip between the belt and the pressure rotator to press a recording medium passing through the fixing nip;

a supplier at a position above and upstream from the nip formation pad in the traveling direction to supply lubricant to an inner face of the belt; and means for holding the lubricant adhered to the inner face of the belt, wherein the fixing nip forms a line passing through an entrance of the fixing nip and an exit of the fixing nip, the belt forms a tangent at a contacting point with the supplier, the tangent extends to the nip formation pad adjacent to the entrance of the fixing nip in the traveling direction, and the line and the tangent form an angle that is 25 degrees or more and 55 degrees or less, wherein:

the means for holding has end portions at both ends of the means for holding in a width direction of the means for holding, each of the end portions contacting the belt has a first length in the traveling direction, and another portion between the end portions of the means for holding in the width direction has a second length shorter than the first length in the traveling direction.

6. The fixing device according to claim 5, wherein the means for holding is made of non-woven fabric.

7. The fixing device according to claim 5, wherein the means for holding is made of a fiber body.

8. An image forming apparatus comprising the fixing device according to claim 5.

* * * * *